(12) United States Patent
Takishima

(10) Patent No.: US 8,958,122 B2
(45) Date of Patent: Feb. 17, 2015

(54) IMAGE DATA DISTRIBUTION APPARATUS, IMAGE DATA DISTRIBUTION SYSTEM, AND COMPUTER-READABLE STORAGE MEDIUM

(75) Inventor: Naoki Takishima, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 46 days.

(21) Appl. No.: 13/525,854

(22) Filed: Jun. 18, 2012

(65) Prior Publication Data

US 2012/0327482 A1 Dec. 27, 2012

(30) Foreign Application Priority Data

Jun. 23, 2011 (JP) .................................. 2011-139413
May 9, 2012 (JP) .................................. 2012-107889

(51) Int. Cl.
*H04N 1/00* (2006.01)
*H04N 1/32* (2006.01)

(52) U.S. Cl.
CPC ....... *H04N 1/32085* (2013.01); *H04N 1/00912* (2013.01); *H04N 1/32037* (2013.01); *H04N 2201/3273* (2013.01); *H04N 1/00411* (2013.01); *H04N 1/00448* (2013.01); *H04N 1/00482* (2013.01); *H04N 1/32042* (2013.01); *H04N 2201/0094* (2013.01); *H04N 2201/3222* (2013.01)

USPC ........... 358/1.6; 358/1.15; 358/408; 271/278; 271/279; 271/298

(58) Field of Classification Search
USPC .................. 358/1.6, 1.9, 1.15, 505, 407, 408; 271/4.01, 278, 279, 298; 709/201
See application file for complete search history.

(56) References Cited

U.S. PATENT DOCUMENTS

| | | | | |
|---|---|---|---|---|
| 5,461,488 A | * | 10/1995 | Witek | 358/402 |
| 5,598,557 A | * | 1/1997 | Doner et al. | 1/1 |
| 2002/0027675 A1 | * | 3/2002 | Minato | 358/1.15 |
| 2003/0048303 A1 | * | 3/2003 | Mesa et al. | 345/771 |
| 2005/0141044 A1 | * | 6/2005 | Morita | 358/448 |
| 2006/0001907 A1 | * | 1/2006 | Kumagai | 358/1.15 |
| 2008/0273229 A1 | * | 11/2008 | Morisawa | 358/498 |

FOREIGN PATENT DOCUMENTS

JP 2010-219700 A 9/2010

* cited by examiner

*Primary Examiner* — Jamares Q Washington
(74) *Attorney, Agent, or Firm* — Harness, Dickey & Pierce

(57) ABSTRACT

An image data distribution apparatus includes an image data separating unit configured to separate image data obtained through a series of document read operations into a plurality of pieces of image data according to a predetermined condition; and an image data distributing unit configured to determine a distribution destination for each of the separated pieces of image data and distribute the separated pieces of image data to the corresponding distribution destinations, respectively.

14 Claims, 13 Drawing Sheets

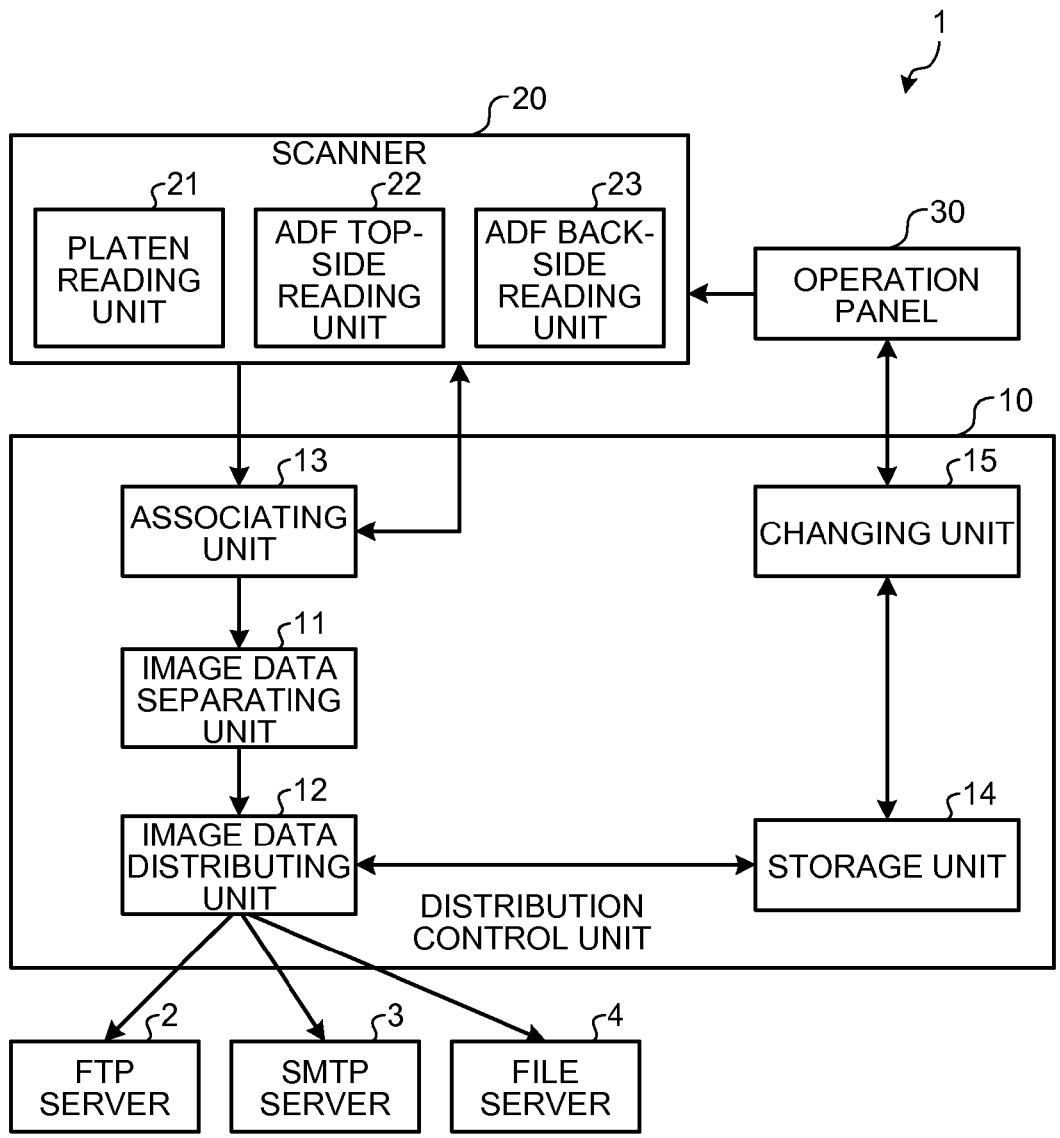

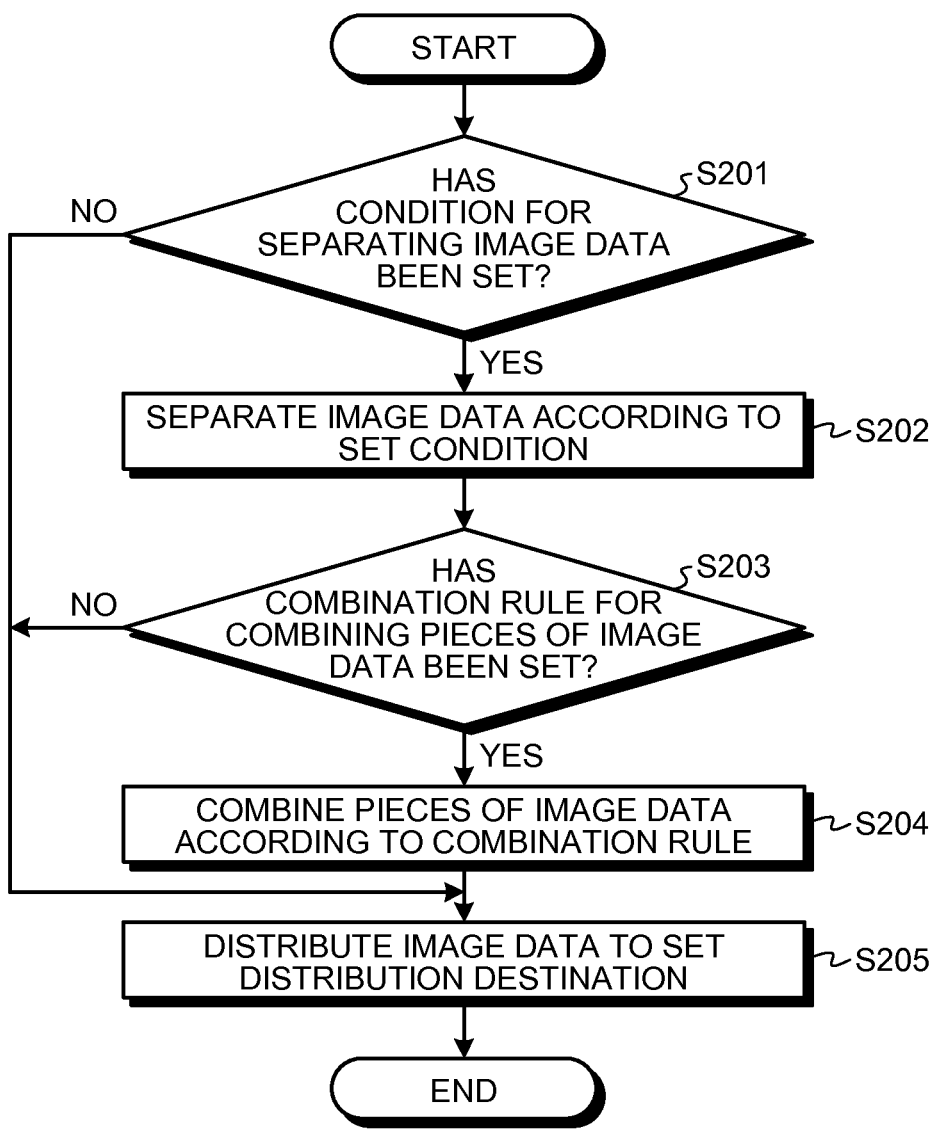

IMAGE DATA DISTRIBUTION APPARATUS, IMAGE DATA DISTRIBUTION SYSTEM, AND COMPUTER-READABLE STORAGE MEDIUM

CROSS-REFERENCE TO RELATED APPLICATIONS

The present application claims priority to and incorporates by reference the entire contents of Japanese Patent Application No. 2011-139413 filed in Japan on Jun. 23, 2011 and Japanese Patent Application No. 2012-107889 filed in Japan on May 9, 2012.

BACKGROUND OF THE INVENTION

1. Field of the Invention

The present invention relates to an image data distribution apparatus, an image data distribution system, and a computer-readable storage medium.

2. Description of the Related Art

Conventionally, an image data distribution apparatus is known that distributes image data of documents read by a scanner to a designated distribution designation. For example, Japanese Application Laid-open Publication No. 2010-219700 discloses a technology, in which an image forming apparatus including a scanner is connected to a distribution server via a network such that the distribution server distributes image data of documents read by the scanner of the image forming apparatus to a designated distribution destination. In the technology described in Japanese Application Laid-open Publication No. 2010-219700, the distribution server accumulates pieces of image data that have been distributed in the past, displays a list of the pieces of image data on the image forming apparatus, and distributes image data selected from the list to the distribution destination in order that the same image data as have been distributed in the past can efficiently be distributed.

As the scanner for reading documents, a scanner is widely used that includes a reading unit for reading a document which is pressed against a contact glass by a platen (hereinafter, this reading unit is described as a "platen reading unit") and includes a reading unit for reading documents conveyed by an automatic document feeder (ADF) (hereinafter, this reading unit is described as an "ADF reading unit"). The scanner of this type causes the ADF reading unit to read a plurality of pages particularly when the plurality of documents are to be read or when both sides of each document are to be read. Furthermore, there is a known scanner that separately includes an ADF reading unit for reading a top side of each document conveyed by an ADF (hereinafter, this reading unit is described as an "ADF top-side reading unit") and an ADF reading unit for reading a back side of each document (hereinafter, this reading unit is described as an "ADF back-side reading unit") to increase a speed of reading the both sides of the document.

In some cases, the scanner as described above performs a series of document read operations for reading documents by different reading units, such as a read operation by the platen reading unit, a read operation by the ADF top-side reading unit, and a read operation by the ADF back-side reading unit, as one job. For example, when the scanner reads a registration document containing an application form with a plurality of pages and a certification form, such as a driver license, the top side of the application form is read by the ADF top-side reading unit, the back side of the application form is read by the ADF back-side reading unit, and the certification form, such as a driver license, is read by the platen reading unit. In this case, the series of document read operations can be executed as one job. Furthermore, pieces of image data obtained through one job can be distributed collectively.

Meanwhile, when the pieces of image data read through one job are collectively distributed, there is a need to change distribution destinations depending on read sources. For example, in the example of the registration document as described above, in some cases, it is desirable to distribute the top side of the application form to a FTP server, distribute the back side of the application form to an electronic mail (e-mail) distribution server, and distribute the certification form, such as a driver license, to a file server for the purpose of managing the document. There is also a demand to distribute the image data read through one job to a plurality of distribution destinations according to a predetermined condition.

However, the conventional image data distribution apparatus handles image data read through the series of document read operations as one piece of image data and can only designate one distribution destination for the image data. Therefore, when the image data read through one job is collectively distributed, it is impossible to flexibly change a distribution destination depending on the read source at a request by a user or to flexibly distribute the image data to a plurality of distribution destinations, resulting in reduced efficiency.

Therefore, there is a need to provide an image data distribution apparatus, an image data distribution system, and a computer-readable storage medium capable of efficiently distributing image data.

SUMMARY OF THE INVENTION

It is an object of the present invention to at least partially solve the problems in the conventional technology.

According to an embodiment, there is provided an image data distribution apparatus that includes an image data separating unit configured to separate image data obtained through a series of document read operations into a plurality of pieces of image data according to a predetermined condition; and an image data distributing unit configured to determine a distribution destination for each of the separated pieces of image data and distribute the separated pieces of image data to the corresponding distribution destinations, respectively.

According to another embodiment, there is provided an image data distribution system that includes a reading device configured to read documents; and an image data distribution apparatus. The reading device sends image data obtained through a series of document read operations to the image data distribution apparatus. The image data distribution apparatus includes an image data separating unit configured to separate the image data obtained through the series of document read operations into a plurality of pieces of image data according to a predetermined condition; and an image data distributing unit configured to determine a distribution destination for each of the separated pieces of image data and distribute the separated pieces of image data to the corresponding distribution destinations, respectively.

According to still another embodiment, there is provided a non-transitory computer-readable storage medium with an executable program stored thereon. The program instructs a computer to perform separating image data obtained through a series of document read operations performed into a plurality of pieces of image data according to a predetermined condition; determining a distribution destination for each of the separated pieces of image data; and distributing the separated pieces of image data to the corresponding distribution destinations, respectively.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a block diagram of a configuration of a multifunction peripheral (MFP) in relation to distribution of image data;

FIG. 4 is a diagram illustrating an example of a correspondence relation between read-source identification information and a distribution destination of image data;

FIG. 18 is a flowchart of a flow of an image data distribution process performed by a distribution control unit of the MFP according to the fourth modification.

DETAILED DESCRIPTION OF THE PREFERRED EMBODIMENTS

Figure 1:
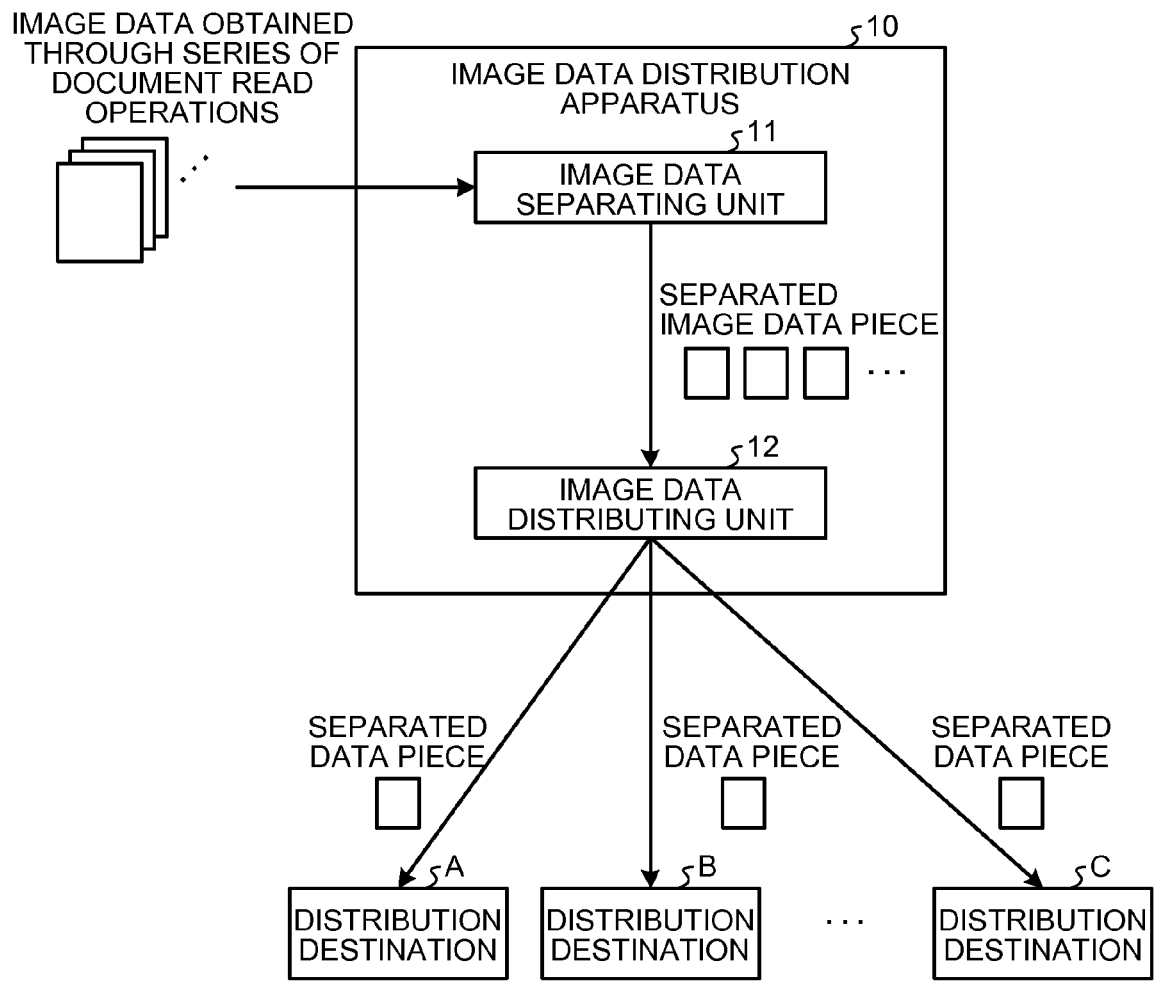
FIG. 1 is a block diagram of a basic configuration of an image data distribution apparatus.

Exemplary embodiments of the present invention will be explained in detail below with reference to the accompanying drawings.
Overview of Image Data Distribution Apparatus The overview of an image data distribution apparatus according to an embodiment will be explained below with reference to FIG. 1. FIG. 1 is a block diagram of a basic configuration of an image data distribution apparatus 10 according to the embodiment. The image data distribution apparatus 10 according to the embodiment includes, as illustrated in FIG. 1, an image data separating unit 11 and an image data distributing unit 12.

The image data separating unit 11 separates image data obtained through a series of document read operations for reading documents by a scanner (a reading device) into a plurality of pieces of image data according to a predetermined condition. Examples of the predetermined condition include such conditions that the image data is separated according to read sources that have read documents, that the image data is separated for every predetermined number of pages of documents, that the image data is separated based on the position of a keyword registered in advance or specified by a user, and that the image data is separated for individual document sets when a plurality of document sets are sequentially set and read.

A conventional image data distribution apparatus handles image data obtained through a series of document read operations as one piece of data. By contrast, the image data distribution apparatus 10 according to the embodiment includes the image data separating unit 11 to enable to separate the image data obtained through the series of document read operations into a plurality of pieces of image data according to a predetermined condition and handle each of the pieces of image data as individual data.

The image data distributing unit 12 determines a distribution destination for each of the pieces of image data separated by the image data separating unit 11, and distributes the pieces of image data to the respective determined distribution destinations. For example, when a distribution destination A, a distribution destination B, . . . , a distribution destination C are communicably connected to the image data distribution apparatus 10 as candidate distribution destinations of image data, the image data distributing unit 12 determines one of the distribution destination A, the distribution destination B, . . . , the distribution destination C as a destination to which each of the pieces of image data separated by the image data separating unit 11 is distributed. The image data distributing unit 12 distributes each of the pieces of image data separated by the image data separating unit 11 to the determined distribution destination.

Each of the distribution destination A, the distribution destination B, . . . , the distribution destination C as candidate distribution destinations of the image data may be configured as an individual external apparatus (for example, an external server of the image data distribution apparatus 10) or a different data storage destination in an independent external apparatus (for example, a different folder provided in the external apparatus). The image data distributing unit 12 can determine a data storage destination in the image data distribution apparatus 10 (for example, an individual folder provided in the image data distribution apparatus 10) for each of the pieces of image data separated by the image data separating unit 11, and store each of the pieces of image data in the determined data storage destination.

The image data distribution apparatus 10 according to the embodiment can be realized as, for example, one function of a scanner (a reading device) that reads a document(s) or one function of an image forming apparatus including the scanner. The image data distribution apparatus 10 according to the embodiment can be realized as an apparatus (a server computer or the like) separate from the scanner or the image forming apparatus including the scanner and connected to the scanner or the image forming apparatus including the scanner via a communication network. In this case, the image data distribution apparatus 10 acquires image data obtained through a series of document read operations from the scanner or the image forming apparatus including the scanner via the communication network.

When the image data distribution apparatus 10 according to the embodiment is realized as one function of the scanner or the image forming apparatus including the scanner, the functions of the image data separating unit 11 and the image data distributing unit 12 can be realized by causing a computer provided in the scanner or the image forming apparatus including the scanner to execute a program. In other words, the image data distribution apparatus 10 according to the embodiment can be provided as a program to be executed by a computer in the scanner or the image forming apparatus including the scanner.

Similarly, when the image data distribution apparatus 10 according to the embodiment is realized by a server computer or the like that is separate from the scanner or the image forming apparatus including the scanner, the functions of the image data separating unit 11 and the image data distributing unit 12 can be realized by causing the server computer to execute a program. In other words, the image data distribution apparatus 10 according to the embodiment can be provided as a program to be executed by the server computer or the like.

Image Data Distribution System

In the following, an image data distribution system including a multifunction peripheral (MFP) will be explained with an example in which the image data distribution apparatus 10 according to the embodiment is realized as one function of the MFP including a scanner, a FTP server is used as the distribution destination A, a SMTP server is used as the distribution destination B, and a file server is used as the distribution destination C.

Figure 2:
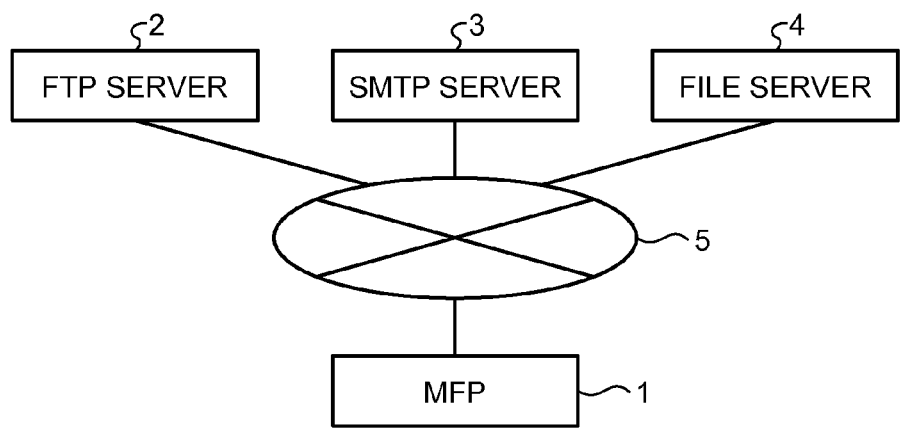
FIG. 2 is a system configuration diagram of a schematic configuration of an image data distribution system.

FIG. 2 is a system configuration diagram illustrating a schematic configuration of the image data distribution system including an MFP 1 according to the embodiment. As illustrated in FIG. 2, the image data distribution system includes the MFP 1, a FTP server 2, a SMTP server 3, and a file server 4. The MFP 1, the FTP server 2, the SMTP server 3, and the file server 4 are connected to one another via a communication network 5. A form of the communication network 5 can be arbitrary; for example, the Internet or a local area network (LAN) can be applied.

The FTP server 2 is a server that transmits and receives a file by using a file transfer protocol (FTP). The SMTP server 3 is a server that transmits an electronic mail (e-mail) by using a simple mail transfer protocol (SMTP). The file server 4 is a server that accumulates and manages files shared over the communication network 5. The FTP server 2, the SMTP server 3, and the file server 4 are accessed in an image data distribution process performed by the MFP 1.

MFP

A concrete example of the MFP 1 according to the embodiment will be explained below. FIG. 3 is a block diagram of a configuration of the MFP 1 in relation to distribution of image data according to the embodiment. As illustrated in FIG. 3, the MFP 1 includes the image data distribution apparatus 10, which is hereinafter referred to as a distribution control unit 10, a scanner 20, and an operation panel 30.

The scanner 20 includes three reading units, i.e., a platen reading unit 21, an ADF top-side reading unit 22, and an ADF back-side reading unit 23. The platen reading unit 21 reads a document that is pressed against a contact glass by a platen. The ADF top-side reading unit 22 reads a top side of each document conveyed by an ADF. The ADF back-side reading unit 23 reads a back side of each document conveyed by the ADF. Image data of documents read by any of the above reading units of the scanner 20 is sent to the distribution control unit 10. A series of document read operations performed by the scanner 20 is monitored by the distribution control unit 10.

The operation panel 30 receives input of an operation on the MFP 1 from a user and displays various types of information. The input from the user through the operation panel 30 is notified to the scanner 20 and the distribution control unit 10.

The distribution control unit 10 includes an associating unit 13, the image data separating unit 11, a storage unit 14, a changing unit 15, and the image data distributing unit 12.

The associating unit 13 associates image data of documents read by the scanner 20 with read-source identification information for identifying a read source of the documents. Specifically, when, for example, the scanner 20 starts reading the documents, the associating unit 13 monitors the read operation and determines which one of the platen reading unit 21, the ADF top-side reading unit 22, and the ADF back-side reading unit 23 reads the documents. Upon receiving the image data from the scanner 20, the associating unit 13 adds the read-source identification information, which is determined in advance as information for identifying a reading unit (a read source) that has read the documents, to the image data, thereby associating the image data with the read-source identification information. Thereafter, the associating unit 13 sends the image data with the added read-source identification information to the image data separating unit 11. In the present embodiment, "a read source" indicates a reading unit that has read the document(s) from among a plurality of reading units (the platen reading unit 21, the ADF top-side reading unit 22, and the ADF back-side reading unit 23) included in the scanner as a single reading device. These reading units are distinguished by a reading system. Therefore, "a read source" of document(s) can be described as "a reading system".

The read source of document(s) is determined in the following manner. For example, when a signal of a sensor that detects open or close of a platen is input and it is detected that the platen is opened before a document is read and the document starts to be read after the platen is closed, it is determined that the platen reading unit 21 reads the document. On the other hand, when the documents starts to be read without opening or closing the platen, it is determined that the ADF top-side reading unit 22 or the ADF back-side reading unit 23 reads the documents. Alternatively, the following way is also applicable. For example, when a signal of a sensor that detects whether or not the document is set on an ADF tray is input, and if the document starts to be read while the document is set on the ADF tray, it is determined that the ADF top-side reading unit 22 or the ADF back-side reading unit 23 reads the document. If the document start to be read without being set on the ADF tray, it is determined that the platen reading unit 21 reads the document.

To determine whether the ADF top-side reading unit 22 reads the documents or the ADF back-side reading unit 23 reads the documents, it may be possible to determine that when, for example, a user sets and inputs setting information by using the operation panel 30 such that the setting information include a designation of both-side reading, the ADF top-side reading unit 22 reads odd pages of the documents and the ADF back-side reading unit 23 reads even pages of the documents.

The image data separating unit 11 separates the image data obtained through a series of document read operations performed by the scanner 20 into pieces of image data according to the read sources that have read the documents. In other words, the image data separating unit 11 separates the image data obtained through the series of document read operations performed by the scanner 20 such that pieces of image data to which the same read-source identification information is added by the associating unit 13 are handled as a single piece of image data based on the read-source identification information.

The storage unit 14 stores therein a correspondence relation between the read-source identification information and a distribution destination of the image data associated with the read-source identification information. FIG. 4 is a diagram illustrating an example of the correspondence relation stored in the storage unit 14. In the example of the correspondence relation illustrated in FIG. 4, when the read-source identification information indicates the ADF top-side reading unit 22, a distribution destination of the image data associated with the read-source identification information is the FTP server 2. When the read-source identification information indicates the ADF back-side reading unit 23, a distribution destination of the image data associated with the read-source identification information is the SMTP server 3 and the file server 4. When the read-source identification information indicates the platen reading unit 21, a distribution destination of the image data associated with the read-source identification information is the file server 4.

The changing unit 15 changes the correspondence relation between the read-source identification information and the distribution destination of the image data associated with the read-source identification information stored in the storage unit 14, depending on an input from a user through the operation panel 30. Specifically, when, for example, the user inputs any designation to change a setting of the distribution destination of the image data, the changing unit 15 reads out the current association relationship stored in the storage unit 14 and displays the read association relationship on the operation panel 30. Subsequently, when the user performs a certain input to change the correspondence relation displayed on the operation panel 30, the changing unit 15 acquires input information from the user through the operation panel 30 and rewrites the correspondence relation stored in the storage unit 14 in accordance with the input information from the user. Therefore, the user can arbitrarily change the distribution destinations of the pieces of image data for each of the read sources.

The image data distributing unit 12 distributes each of the pieces of image data, with which the read-source identification information is associated by the associating unit 13 and which is separated by the image data separating unit 11 according to the read sources, to the distribution destination determined according to the read-source identification information. Specifically, the image data distributing unit 12 refers to the correspondence relation between the read-source identification information and the distribution destination of the image data associated with the read-source identification information stored in the storage unit 14, and distributes each of the pieces of image data separated by the image data separating unit 11 to a distribution destination associated with each of the pieces of image data in accordance with the read-source identification information.

For example, when the correspondence relation illustrated in FIG. 4 is stored in the storage unit 14, the image data distributing unit 12 distributes image data associated with the read-source identification information indicating the ADF top-side reading unit 22 to the FTP server 2. Furthermore, the image data distributing unit 12 distributes image data associated with the read-source identification information indicating the ADF back-side reading unit 23 to the SMTP server 3 and the file server 4. Moreover, the image data distributing unit 12 distributes image data associated with the read-source identification information indicating the platen reading unit 21 to the file server 4.

The series of the document read operations performed by the scanner 20 indicates a series of read operations that the scanner 20 performs as one job. The scanner 20 can perform a series of document read operations using different reading units as one job, including operations of reading a document(s) by each of the platen reading unit 21, the ADF top-side reading unit 22, and the ADF back-side reading unit 23.

In the MFP 1 of the present embodiment, when the scanner 20 performs the series of document read operations using different reading units as one job as described above, the image data separating unit 11 of the distribution control unit 10 separates the image data obtained through the document read operations performed by the scanner 20 into pieces of image data according to the read sources and the image data distributing unit 12 distributes each of the pieces of image data to a distribution destination corresponding to the read-source identification information associated with each of the pieces of image data. Therefore, it is possible to collectively distribute a plurality of pieces of image data that have been read by different read sources in one job.

The associating unit 13, the image data separating unit 11, the changing unit 15, and the image data distributing unit 12 as described above are realized by, for example, a program executed by the distribution control unit 10. In this case, the distribution control unit 10 includes, as a hardware configuration, a central processing unit (CPU) that executes the program, a read only memory (ROM) for storing the program, and a random access memory used as a work area of the CPU. It is possible to realize at least a part of the associating unit 13, the image data separating unit 11, the changing unit 15, and the image data distributing unit 12 by using, for example, special hardware, such as an application specific integrated circuit (ASIC) or a field-programmable gate array (FPGA).

The storage unit 14 described above can be realized by using, for example, a nonvolatile memory provided in the distribution control unit 10. The storage unit 14 may be realized by storing the correspondence relation in an auxiliary storage device as an external storage device of the distribution control unit 10 and loading the correspondence relation from the auxiliary storage device to the RAM provided in the distribution control unit 10.

Figure 5:
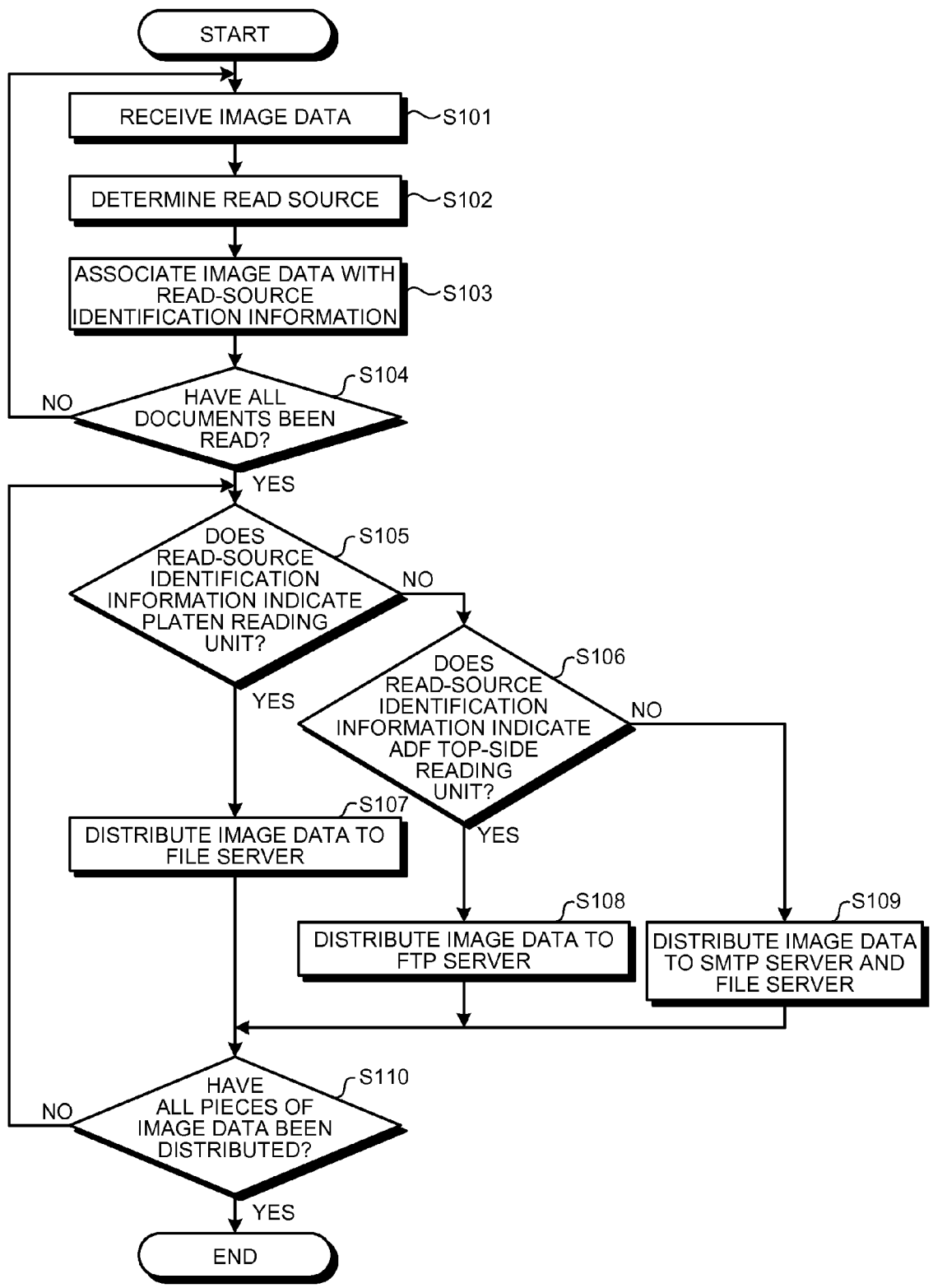
FIG. 5 is a flowchart of a flow of an image data distribution process performed by a distribution control unit of the MFP.

A concrete example of the image data distribution process performed by the MFP 1 of the present embodiment will be explained below with reference to FIG. 5. FIG. 5 is a flowchart of a flow of the image data distribution process performed by the distribution control unit 10 of the MFP 1. The flowchart in FIG. 5 illustrates an example in which the correspondence relation illustrated in FIG. 4 is stored in the storage unit 14 of the distribution control unit 10.

At Step S101, the associating unit 13 receives image data acquired by the scanner 20, and the process proceeds to Step S102.

At Step S102, the associating unit 13 determines the read source that has read the document(s) corresponding to the image data received at Step S101, and the process proceeds to Step S103. The read source is determined in the manner as described above.

At Step S103, the associating unit 13 associates the image data input at Step S101 with the read-source identification information indicating the read source determined at Step S102, and the process proceeds to Step S104.

At Step S104, the associating unit 13 determines whether or not all the documents are read. When there is a document that has not been read (NO at Step S104), the process returns to Step S101 and is repeated from Step S101. When all the documents have been read (YES at Step S104), the image data separating unit 11 separates the image data into pieces of image data according to the read sources based on the read-source identification information associated with the image data, and the process proceeds to Step S105.

At Step S105, the image data distributing unit 12 determines whether the read-source identification information associated with the image data to be distributed indicates the platen reading unit 21. When the read-source identification information does not indicate the platen reading unit 21 (NO at Step S105), the process proceeds to Step S106. When the read-source identification information indicates the platen reading unit (YES at Step S105), the process proceeds to Step S107.

At Step S106, the image data distributing unit 12 determines whether the read-source identification information associated with the image data to be distributed indicates the ADF top-side reading unit 22. When the read-source identification information indicates the ADF top-side reading unit 22 (YES at Step S106), the process proceeds to Step S108. When the read-source identification information does not indicate the ADF top-side reading unit 22, that is, when the read-source identification information indicates the ADF back-side reading unit 23 (NO at Step S106), the process proceeds to Step S109.

At Step S107, the image data distributing unit 12 distributes the image data associated with the read-source identification information indicating the platen reading unit 21 to the file server 4, and the process proceeds to Step S110.

At Step S108, the image data distributing unit 12 distributes the image data associated with the read-source identification information indicating the ADF top-side reading unit 22 to the FTP server 2, and the process proceeds to Step S110.

At Step S109, the image data distributing unit 12 distributes the image data associated with the read-source identification information indicating the ADF back-side reading unit 23 to the SMTP server 3 and the file server 4, and the process proceeds to Step S110.

At Step S110, the image data distributing unit 12 determines whether all pieces of image data have been distributed. When there is a piece of image data that has not been distributed (NO at Step S110), the process returns to Step S105 and is repeated from Step S105. When all pieces of image data have been distributed (YES at Step S110), the series of image data distribution process in the flowchart in FIG. 5 is terminated.

As described above with concrete examples, the MFP 1 according to the present embodiment associates the image data obtained through the series of document read operations performed by the scanner 20 with the read-source identification information for identifying a read source of the document(s) (one of the platen reading unit 21, the ADF top-side reading unit 22, and the ADF back-side reading unit 23). The MFP 1 separates the image data obtained through the series of document read operations into pieces of image data according to the read sources based on the read-source identification information, and distributes each of the pieces of image data to a distribution destination associated with the read-source identification information. Therefore, according to the MFP 1 of the present embodiment, it is possible to efficiently distribute a plurality of pieces of image data that have read by different read sources to different distribution destinations.

Furthermore, according to the MFP 1 of the present embodiment, the correspondence relation between the read-source identification information and a distribution destination of the image data associated with the read-source identification information is stored in the storage unit 14, and the image data distributing unit 12 specifies the distribution destination of the image data by referring to the correspondence relation stored in the storage unit 14. Therefore, it is possible to easily distribute the image data to a distribution destination corresponding to the read source.

Moreover, according to the MFP 1 of the present embodiment, when a plurality of pieces of image data that have read by different read sources are read in one job by the scanner 20, the image data distributing unit 12 distributes each of the pieces of image data contained in the job to a different distribution destination corresponding to the read-source identification information associated with each of the pieces of image data. Therefore, it is possible to collectively distribute a plurality of pieces of image data that have been read by different read sources in one job.

Furthermore, according to the MFP 1 of the present embodiment, the changing unit 15 changes the correspondence relation stored in the storage unit 14 in accordance with an input operation performed by a user through the operation panel 30. Therefore, the user can arbitrarily change a distribution destination of the image data according to the read sources.

Figure 6:
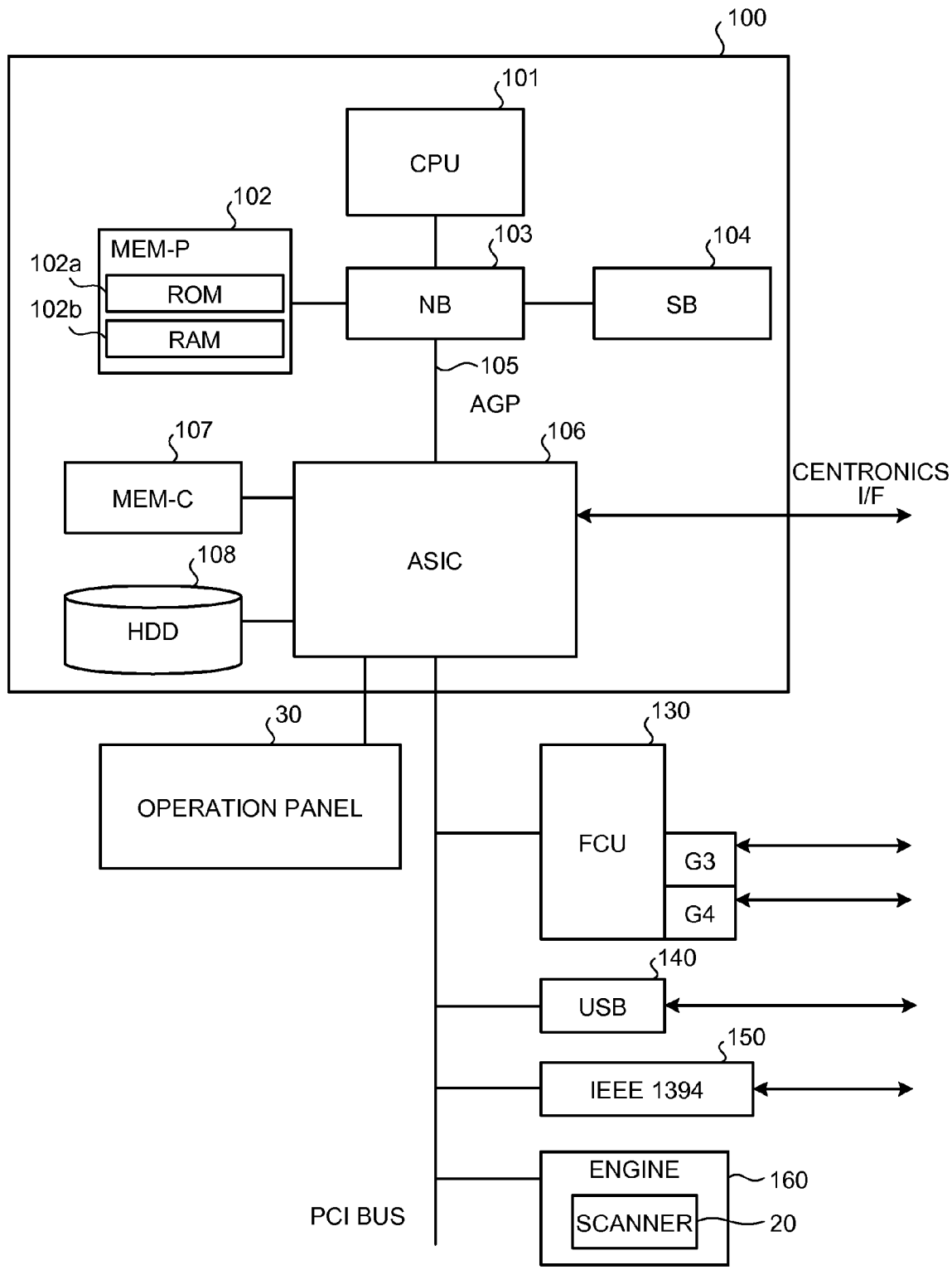
FIG. 6 is a block diagram of a hardware configuration example of the MFP.

FIG. 6 is a block diagram of a hardware configuration example of the MFP 1 according to the present embodiment. As illustrated in FIG. 6, the MFP 1 includes a controller 100 and an engine unit (engine) 160, which are connected to each other via a peripheral component interface (PCI) bus. The controller 100 is a controller that controls the entire MFP 1, picture processing, communications, and inputs that are input from an operating unit, such as the operation panel 30. The engine unit 160 is a printer engine or the like that is connectable to the PCI bus. Examples of the engine unit 160 include a monochrome plotter, a one-drum color plotter, a four-drum color plotter, the scanner 20, and a facsimile unit. The engine unit 160 includes an image processing section for performing error diffusion, gamma correction, or the like, in addition to what is called an engine section, such as the plotter or the scanner 20.

The controller 100 includes a CPU 101, a north bridge (NB) 103, a system memory (MEM-P) 102, a south bridge (SB) 104, a local memory (MEM-C) 107, an ASIC 106, and a hard disk drive (HDD) 108. The NB 103 and the ASIC 106 are connected to an accelerated graphics port (AGP) bus 105. The MEM-P 102 includes a read only memory (ROM) 102a and a random access memory (RAM) 102b.

The CPU 101 controls the entire MFP 1. The CPU 101 includes a chip set formed of the NB 103, the MEM-P 102, and the SB 104. The CPU 101 is connected to other apparatuses via the chip set.

The NB 103 is a bridge for connecting the CPU 101, the MEM-P 102, the SB 104, and the AGP bus 105 to one another. The NB 103 includes a memory controller for controlling read and write with respect to the MEM-P 102, and also includes a PCI master and an AGP target.

The MEM-P 102 is a system memory used as a memory for storing a program and data, a memory for loading a program and data, and a memory for use in picture processing performed by a printer. The MEM-P 102 includes the ROM 102a and the RAM 102b. The ROM 102a is a read only memory for storing a program and data. The RAM 102b is a writable and readable memory used for loading a program and data or used for picture processing performed by a printer.

The SB 104 is a bridge for connecting the NB 103, PCI devices, and peripheral devices to one another. The SB 104 is connected to the NB 103 via the PCI bus. A network interface (I/F) or the like is also connected to the PCI bus.

The ASIC 106 is an integrated circuit (IC) used for image processing including a hardware element for image processing. The ASIC 106 has a function as a bridge to connect the AGP bus 105, the PCI bus, the HDD 108, and the MEM-C 107 to one another. The ASIC 106 includes a PCI target and an AGP master; an arbiter (ARB) that is the central core of the ASIC 106; a memory controller that controls the MEM-C 107; a plurality of direct memory access controllers (DMACs) that rotates image data by using hardware logic; and a PCI unit that performs data transfer with the engine unit 160 via the PCI bus. A facsimile control unit (FCU) 130, a universal serial bus (USB) 140, and the institute of electrical and electronics engineers 1394 (IEEE 1394) interface 150 are connected to the ASIC 106 via the PCI bus. The operation panel 30 is directly connected to the ASIC 106.

The MEM-C 107 is a local memory for use as a copy image buffer or a code buffer. The HDD 108 is a storage device for storing image data, computer programs, font data, or forms.

The AGP bus 105 is a bus interface for a graphics accelerator card introduced to speed up graphics operations. The AGP bus 105 allows direct access to the MEM-P 102 with a high throughput, thereby speeding up operations related to the graphics accelerator card.

In the MFP 1 according to the present embodiment, as described above for example, the associating unit 13, the image data separating unit 11, the changing unit 15, and the image data distributing unit 12 of the distribution control unit 10 are realized by a program. The program executed by the MFP 1 of the present embodiment may be provided by being installed in advance in the ROM 102a or the like.

The program executed by the MFP 1 of the present embodiment may be provided by being recorded in a computer-readable storage medium, such as a CD-ROM, a flexible disk (FD), a CD-R, or a digital versatile disc (DVD), in a computer-installable or computer-executable file format. The program executed by the MFP 1 of the present embodiment may be provided by being stored in a computer connected to a network, such as the Internet, so as to be downloaded via the network. The programs executed by the MFP 1 of the present embodiment may be provided or distributed via a network, such as the Internet.

The program executed by the MFP 1 of the present embodiment have a module structure made up of the above units (the associating unit 13, the image data separating unit 11, the changing unit 15, and the image data distributing unit 12). As actual hardware, the CPU (the processor) 101 reads the program from the ROM 102a and executes the program to load the units on a main memory, such as the RAM 102b, thereby generating the associating unit 13, the image data separating unit 11, the changing unit 15, and the image data distributing unit 12 on the main memory.

Modifications of the MFP 1 according to the above embodiment will be explained below.

First Modification

An MFP according to a first modification separates image data obtained through the series of document read operations performed by the scanner 20 into a plurality of pieces of image data by using a condition different from the condition used by the MFP 1 described above. Specifically, while the MFP 1 described above separates the image data obtained through the series of document read operations by the scanner 20 into pieces of image data according to the read sources, the MFP according to the first modification separates image data obtained from a document(s) containing a plurality of pages read by the scanner 20 into pieces of image data for every predetermined number of pages.

Figure 7:
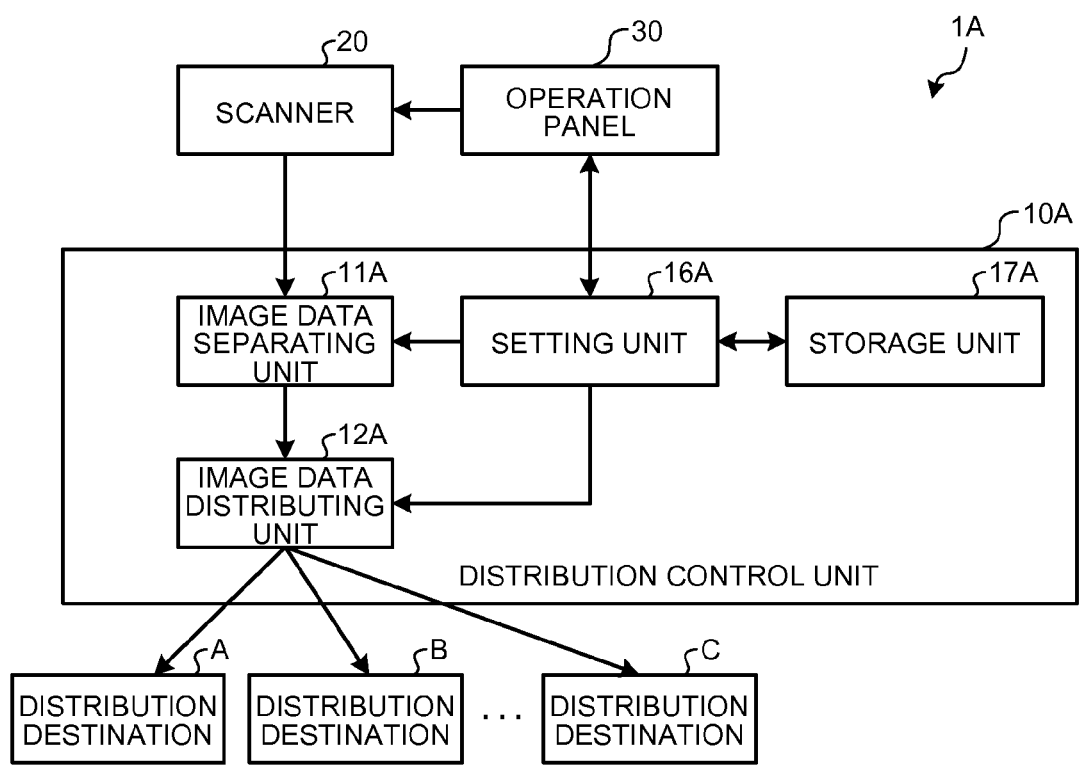
FIG. 7 is a block diagram of a configuration of an MFP in relation to distribution of image data according to a first modification.

FIG. 7 is a block diagram of a configuration of an MFP 1A in relation to distribution of image data according to the first modification. As illustrated in FIG. 7, the MFP 1A according to the first modification includes a distribution control unit 10A instead of the distribution control unit 10 of the MFP 1 described above. The distribution control unit 10A includes an image data separating unit 11A, and an image data distributing unit 12A, a setting unit 16A, and a storage unit 17A.

The image data separating unit 11A separates image data of a document(s) containing a plurality of pages read by the scanner 20 into pieces of image data for every predetermined number of pages set by the setting unit 16A. The setting unit 16A sets the number of pages as a unit for separating the image data based on an input from a user through the operation panel 30 or information stored in the storage unit 17A. When the setting unit 16A sets the number of pages based on the information stored in the storage unit 17A, a default number of pages used as a unit for separating the image data is stored in advance in the storage unit 17A.

Figure 8:
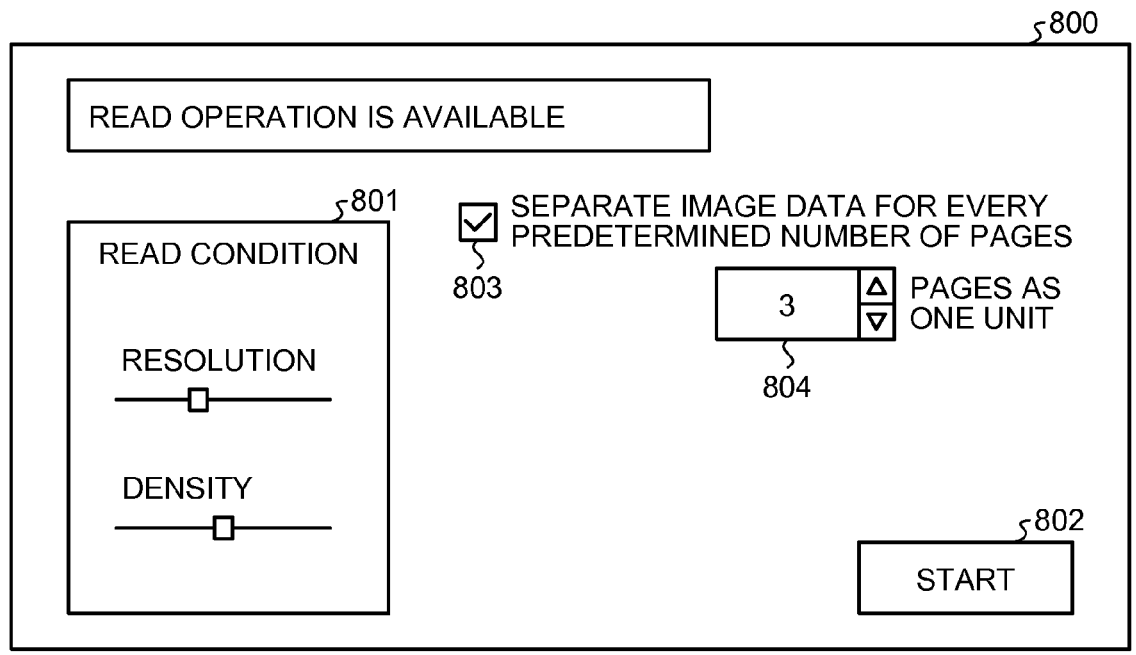
FIG. 8 is a diagram illustrating an example of a setting screen displayed on an operation panel.

When the number of pages is set based on the input from the user through the operation panel 30, the setting unit 16A displays a setting screen 800 as illustrated in FIG. 8 on a touch panel display of the operation panel 30 in response to, for example, an operation of pressing a scanner button for giving an instruction to read a document(s). The setting screen 800 contains a read condition setting field 801 for setting a condition for reading a document(s), a start button for giving an instruction to start reading the document(s), and a check box 803 for allowing a user to specify whether to separate image data according to the number of pages. When the user checks the check box 803 by a touch operation or the like, a page-number setting field 804 for setting the number of pages is displayed in an operable manner. When a desired number of pages is input in the page-number setting field 804 and a start button 802 is pressed, the scanner 20 starts reading the document(s) and the setting unit 16A sets the number of pages input in the page-number setting field 804 as the number of pages to be a unit for separating the image data.

The image data distributing unit 12A distributes pieces of image data separated for every predetermined number of pages by the image data separating unit 11A to distribution destinations set by the setting unit 16A. The setting unit 16A sets a distribution destination for each of the pieces of image data separated for every predetermined number of pages, based on an input form the user through the operation panel 30 or the information stored in the storage unit 17A. When the setting unit 16A sets the distribution destinations of the pieces of image data based on the information stored in the storage unit 17A, a default distribution destination of each of the pieces of image data separated for every predetermined number of pages is stored in advance in the storage unit 17A.

Figure 9:
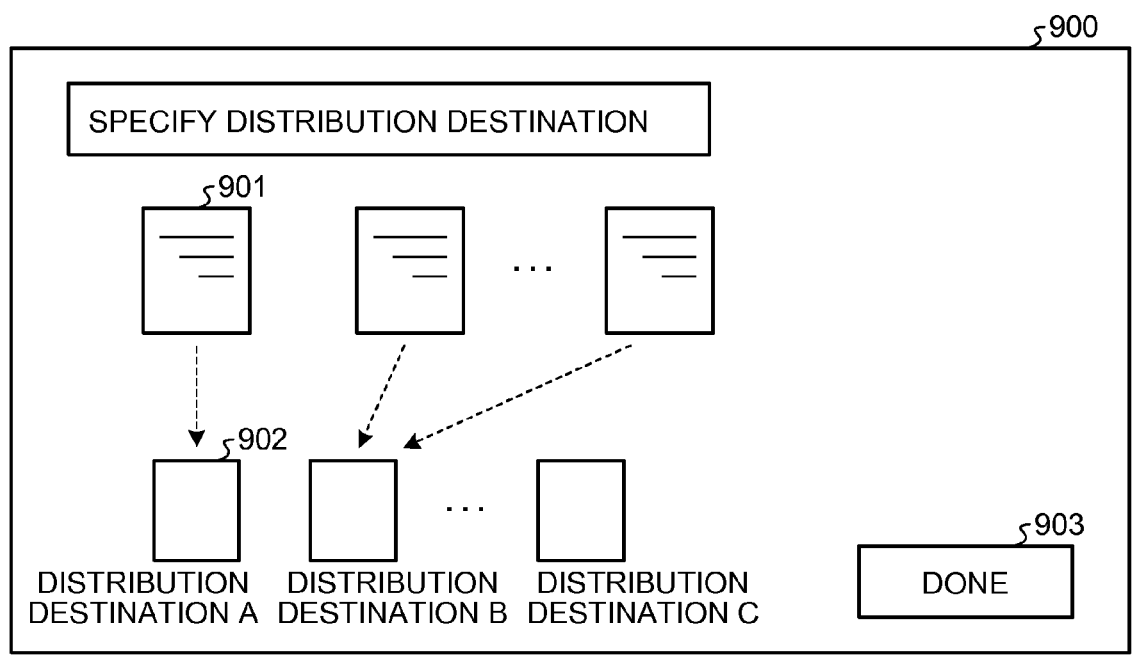
FIG. 9 is a diagram illustrating an example of a distribution-destination designation screen displayed on the operation panel.

When the operation panel 30 sets the distribution destinations of the pieces of image data based on the input from the user, after the scanner 20 completes the series of document read operations and the image data separating unit 11A separates the image data, the setting unit 16A displays, for example, a distribution-destination designation screen 900 illustrated in FIG. 9 on the touch panel display of the operation panel 30. The distribution-destination designation screen 900 contains a thumbnail 901 of each of the separated pieces of image data and icons 902 representing candidate distribution destinations. When the user performs a predetermined operation for associating the image data with a distribution destination, such as a drag-and-drop operation for dragging and dropping the thumbnail 901 onto any of the icons 902 corresponding to a desired distribution destination, and then pressing a determination button 903, the setting unit 16A sets the distribution destination of the image data to the distribution destination that is associated with the image data by the user operation.

As described above, the MFP 1A according to the first modification separates the image data of a document(s) containing a plurality of pages read by the scanner 20 into pieces of image data for every predetermined number of pages, determines a distribution destination of each of the separated pieces of image data, and distributes each of the pieces of image data to the determined distribution destination. Therefore, it is possible to efficiently and flexibly distribute the image data according to user's need.

Second Modification

An MFP according to a second modification separates image data obtained through the series of document read operations by the scanner 20 into a plurality of pieces of image data by using a condition different from the condition used by the MFP 1 described above. Specifically, the MFP according to the second modification detects a keyword from the image data obtained through the series of document read operations performed by the scanner 20, and separates the image data based on the position of the detected keyword.

Figure 10:
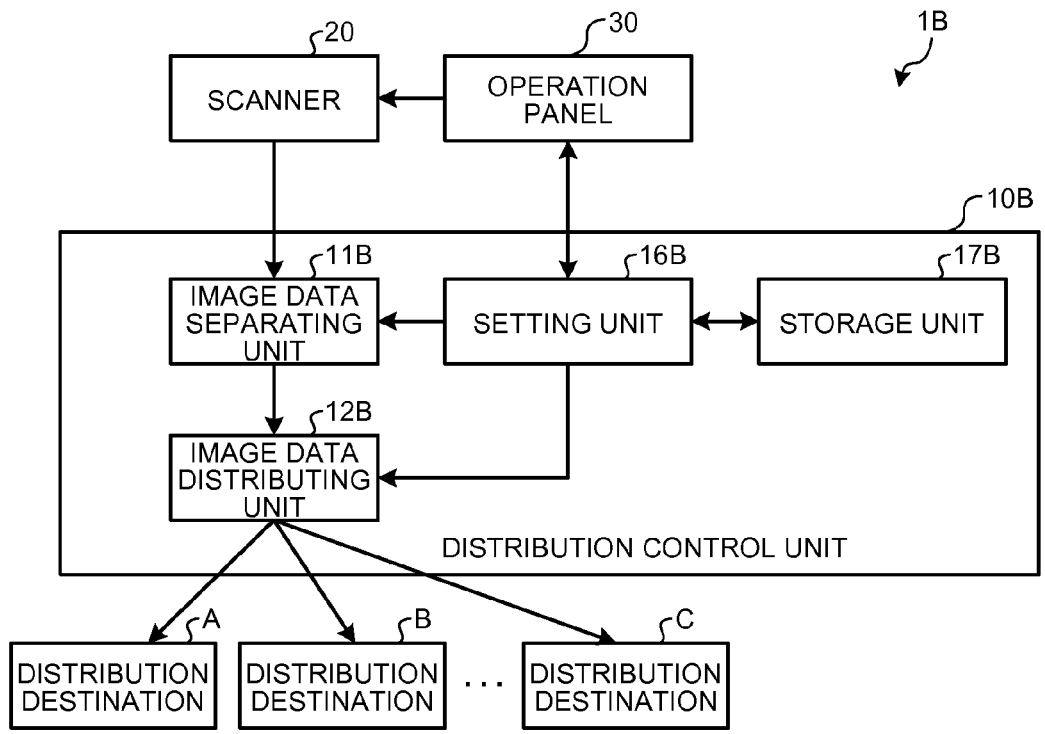
FIG. 10 is a block diagram of a configuration of a MFP in relation to distribution of image data according to a second modification.

FIG. 10 is a block diagram of a configuration of an MFP 1B in relation to distribution of image data according to the second modification. As illustrated in FIG. 10, the MFP 1B according to the second modification includes a distribution control unit 10B instead of the distribution control unit 10 of the MFP 1 described above. The distribution control unit 10B includes an image data separating unit 11B, an image data distributing unit 12B, a setting unit 16B, and a storage unit 17B.

The image data separating unit 11B performs a process of detecting a keyword set by the setting unit 16B from the image data obtained through the series of document read operations performed by the scanner 20, by using, for example, optical character reader (OCR), and separates the image data into pieces of image data based on the position of the detected keyword. For example, when a keyword "application form" is set by the setting unit 16B, the image data separating unit 11B detects a text "application form" from the image data obtained through the series of document read operations performed by the scanner 20, and separates the image data into a piece of image data preceding the position where the text "application form" appears and a piece of image data continuing from the text "application form". Furthermore, when a plurality of keywords are set by the setting unit 16B, the image data separating unit 11B separates the image data by using each of the keywords.

The setting unit 16B sets a keyword used for separating the image data based on an input from a user through the operation panel 30 or information stored in the storage unit 17B. When the setting unit 16B sets the keyword based on the information stored in the storage unit 17B, a default keyword used for separating the image data is stored in advance in the storage unit 17B.

Figure 11:
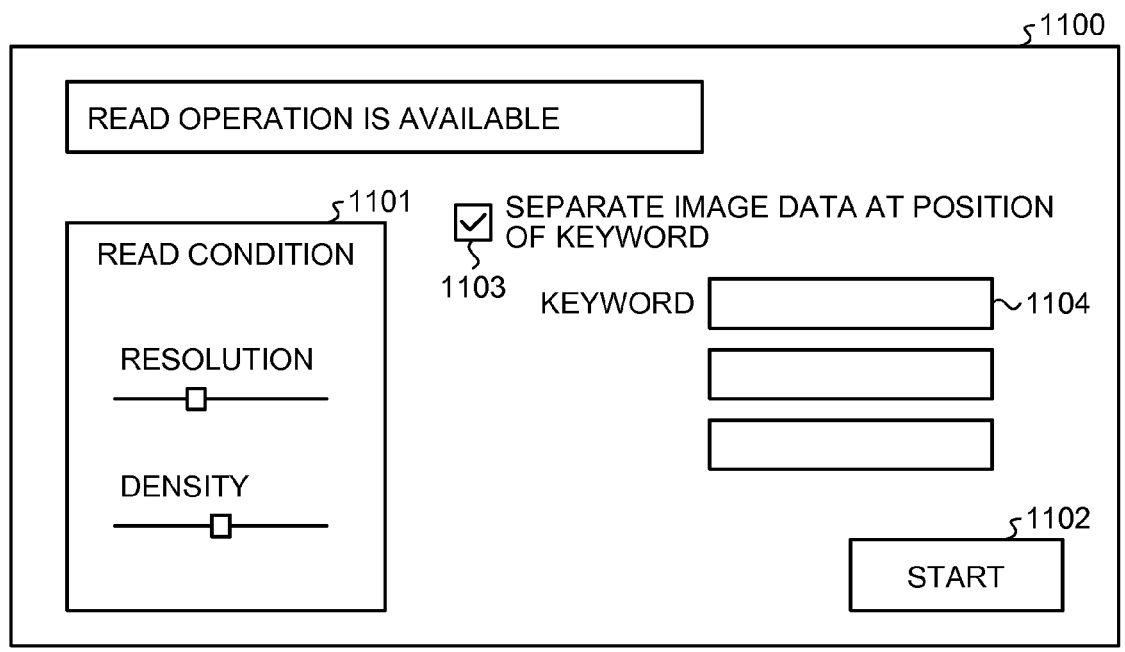
FIG. 11 is a diagram illustrating an example of a setting screen displayed on an operation panel.

When the operation panel 30 sets a keyword based on the input from the user, the setting unit 16B displays a setting screen 1100 illustrated in FIG. 11 on the touch panel display of the operation panel 30 in response to an operation of pressing a scanner button for giving an instruction to read a document(s). The setting screen 1100 contains a read condition setting field 1101 for setting a condition for reading a document(s), a start button 1102 for giving an instruction to start reading a document(s), and a check box 1103 for allowing a user to specify whether to separate the image data at the position of the keyword. When the user checks the check box 1103 by a touch operation or the like, the setting screen 1100 displays a keyword input field 1104 for inputting a keyword in an operable manner. When a desired keyword is input in the keyword input field 1104 and the start button 1102 is pressed, the scanner 20 starts reading a document(s) and the setting unit 16B sets the keyword input in the keyword input field 1104 as a keyword used for separating the image data.

The image data distributing unit 12B distributes pieces of image data separated at the position of the keyword by the image data separating unit 11B to distribution destinations set by the setting unit 16B. The setting unit 16B sets a distribution destination for each of the pieces of image data separated at the position of the keyword, based on an input from the user through the operation panel 30 or information stored in the storage unit 17B. When the setting unit 16B sets the distribution destination of the image based on the information stored in the storage unit 17B, a default distribution destination of each of the pieces of image data including the keyword is stored in advance in the storage unit 17B. When setting the distribution destinations of the respective pieces of image data based on the input from the user through the operation panel 30, the setting unit 16B sets the distribution destination for each of the pieces of image data in the same manner as applied by the setting unit 16A of the first modification.

As described above, the MFP 1B of the second modification separates the image data obtained through the series of document read operations by the scanner 20 into pieces of image data based on the position of the keyword, determines a distribution destination for each of the separated pieces of image data, and distributes each of the pieces of image data to the determined distribution destination. Therefore, it is possible to efficiently and flexibly distribute the image data according to user's need.

Third Modification

An MFP according to a third modification separates the image data obtained through the series of document read operations by the scanner 20 into a plurality of pieces of image data by using a condition different from the condition used by the MFP 1 described above. Specifically, when a plurality of document sets are sequentially set and read by the scanner 20, the MFP according to the third modification separates the image data obtained by the scanner 20 into pieces of image data for each of the document sets.

Figure 12:
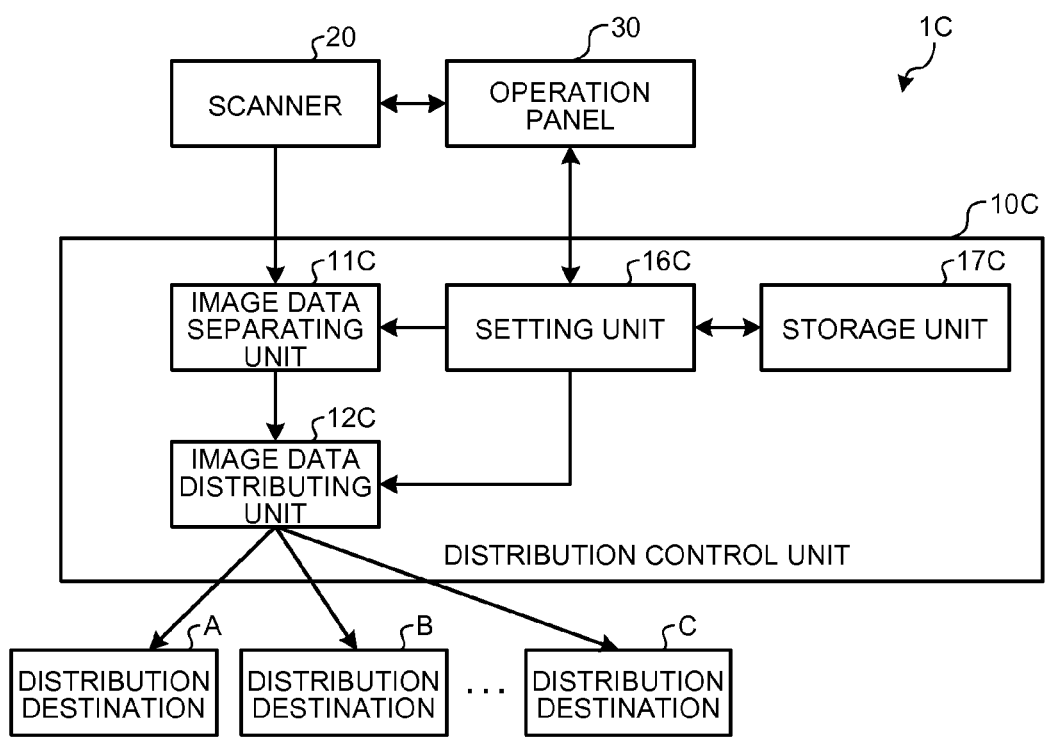
FIG. 12 is a block diagram of a configuration of a MFP in relation to distribution of image data according to a third modification.

FIG. 12 is a block diagram of a configuration of an MFP 1C in relation to distribution of image data according to the third modification. As illustrated in FIG. 12, the MFP 1C according to the third modification includes a distribution control unit 10C instead of the distribution control unit 10 of the MFP 1 described above. The distribution control unit 10C includes an image data separating unit 11C, an image data distributing unit 12C, a setting unit 16C, and a storage unit 17C.

When the setting unit 16C makes a setting to separate image data for each document set, the image data separating unit 11C separates the image data obtained from the document sets that are sequentially set and read by the scanner 20 into pieces of image data for each of the document sets.

Figure 13:
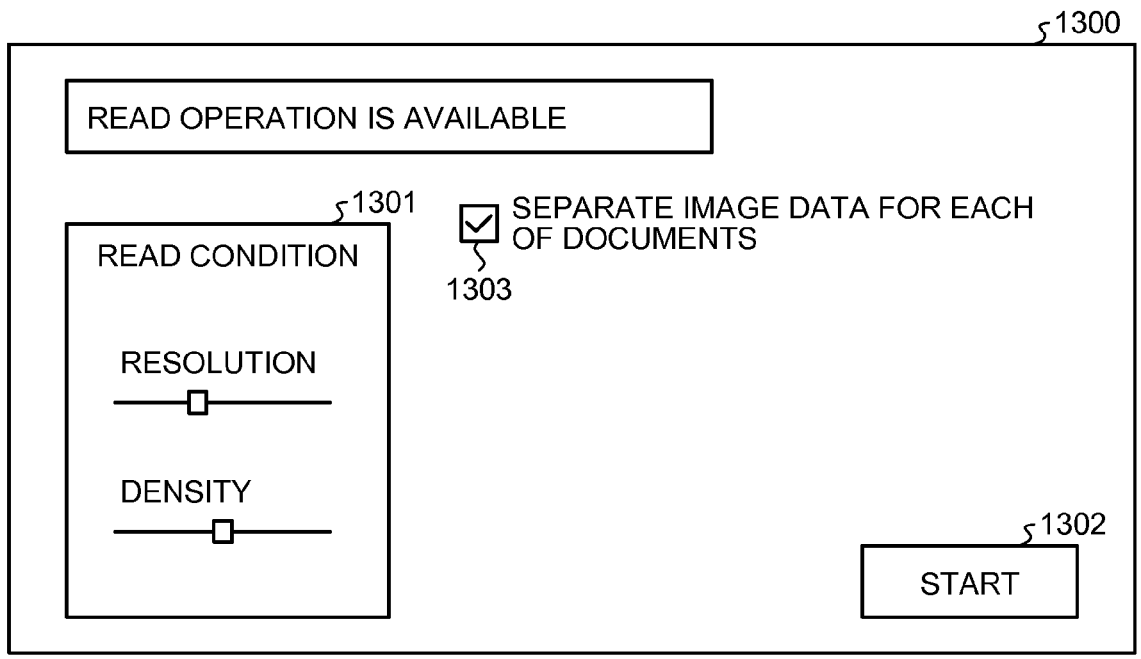
FIG. 13 is a diagram illustrating an example of a setting screen displayed on an operation panel.

The setting unit 16C displays a setting screen 1300 as illustrated in FIG. 13 on the touch panel display of the operation panel 30 in response to an operation of pressing a scanner button for giving an instruction to read a document set. The setting screen 1300 contains a read condition setting field 1301 for setting a condition for reading a document set, a start button 1302 for giving an instruction to start reading a document set, and a check box 1303 for allowing a user to specify whether to separate the image data for each document set. When the user sets a read condition in the read condition setting field 1301, checks the check box 1303 by a touch operation or the like, sets the first document set, and presses the start button 1302, the scanner 20 starts reading the first document set and the setting unit 16C makes a setting to separate the image data for each of the document sets.

Figure 14:
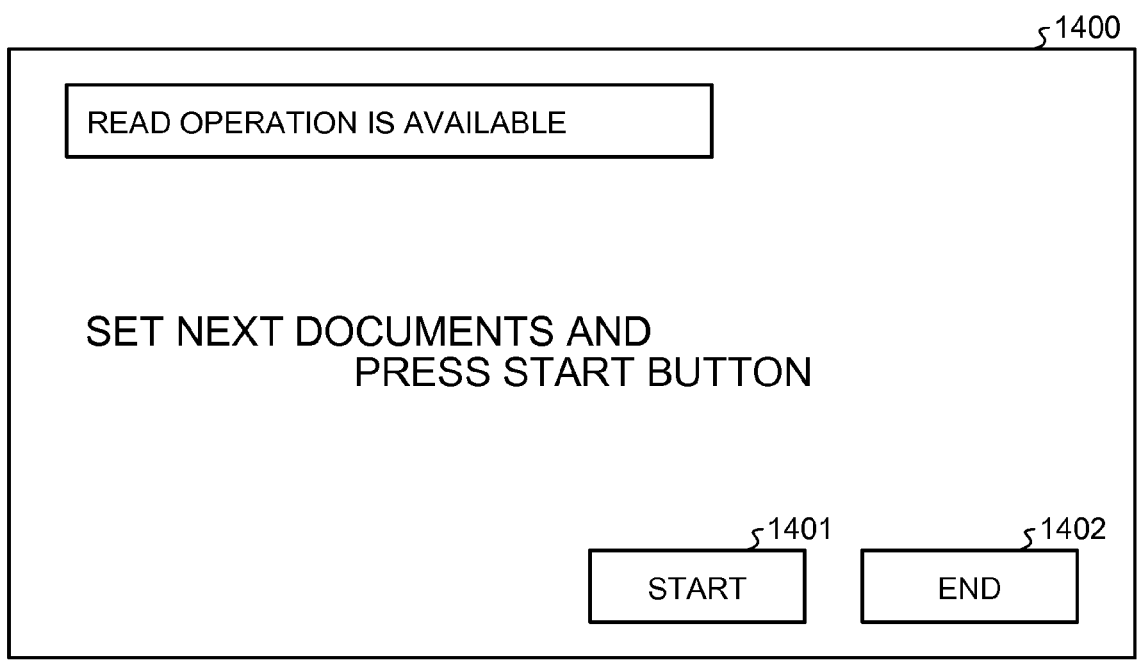
FIG. 14 is a diagram illustrating an example of a message screen displayed on the operation panel.

Thereafter, when the scanner 20 finishes reading the first document set, a screen displayed on the touch panel display of the operation panel is switched to, for example, a message screen 1400 as illustrated in FIG. 14. The message screen 1400 displays a message for instructing a user to set a next document set, a start button 1401 for giving an instruction to start reading the next document set, and an end button 1402 for giving an instruction to finish reading the document sets. When the user sets a next document set and presses the start button 1401, the scanner 20 starts reading the next document set. When the read of the next document set is completed, the message screen 1400 is displayed again on the touch panel display of the operation panel 30. On the other hand, when the end button 1402 is pressed or when a predetermined time has elapsed while the start button 1401 remains unpressed since display of the message screen 1400, the scanner 20 terminates the series of document read operations.

As described above, when the scanner 20 sequentially reads a plurality of document sets that are sequentially set, the read condition set in the read condition setting field 1301 in the setting screen 1300 is applied not only to the first document set but also to subsequently-set document sets. Therefore, it is not needed to set the read condition for each of the document sets, enabling to reduce operational load on the user.

Whether the scanner 20 has completed reading each of the document sets or not can be determined by, for example, detecting completion of one scanning while the platen is closed when the platen reading unit reads the document set, or by detecting absence of a sheet to be automatically conveyed when the ADF reading unit reads the document set. The scanner 20 detects the completion of reading each of the document sets in the above manner, and sends a detection signal to the image data separating unit 11C. For example, the image data separating unit 11C can separate the image data obtained through the series of document read operations by the scanner 20 into pieces of image data for each of the document sets in accordance with the detection signal sent by the scanner 20.

The image data distributing unit 12C distributes each of the pieces of image data separated for each of the document sets by the image data separating unit 11C to a distribution destination set by the setting unit 16C. The setting unit 16C sets a distribution destination for each of the pieces of image data separated for each of the document sets, based on an input from a user through the operation panel 30 or information stored in the storage unit 17C. When the setting unit 16C sets the distribution destination for each of the pieces of image data based on the information stored in the storage unit 17C, a default distribution destination of each of the pieces of image data separated for each of the document sets is stored in advance in the storage unit 17C. When the setting unit 16C sets the distribution destination for each of the pieces of image data based on the input from the user through the operation panel 30, the setting unit 16C sets the distribution destination by using the same method as, for example, the method used by the setting unit 16A of the first modification.

As described above, the MFP 1C according to the third modification separates image data obtained from a plurality of document sets that are sequentially set and read by the scanner 20 into pieces of image data for each of the document sets, determines a distribution destination for each of the separated pieces of image data, and distributes each of the pieces of image data to the determined distribution destination. Therefore, it is possible to efficiently and flexibly distribute the image data according to user's need.

Fourth Modification

An MFP according to a fourth modification separates the image data obtained through the series of document read operations by the scanner 20 into pieces of image data, and combines at least a part of the separated pieces of image data with a different piece of image data according to need.

Figure 15:
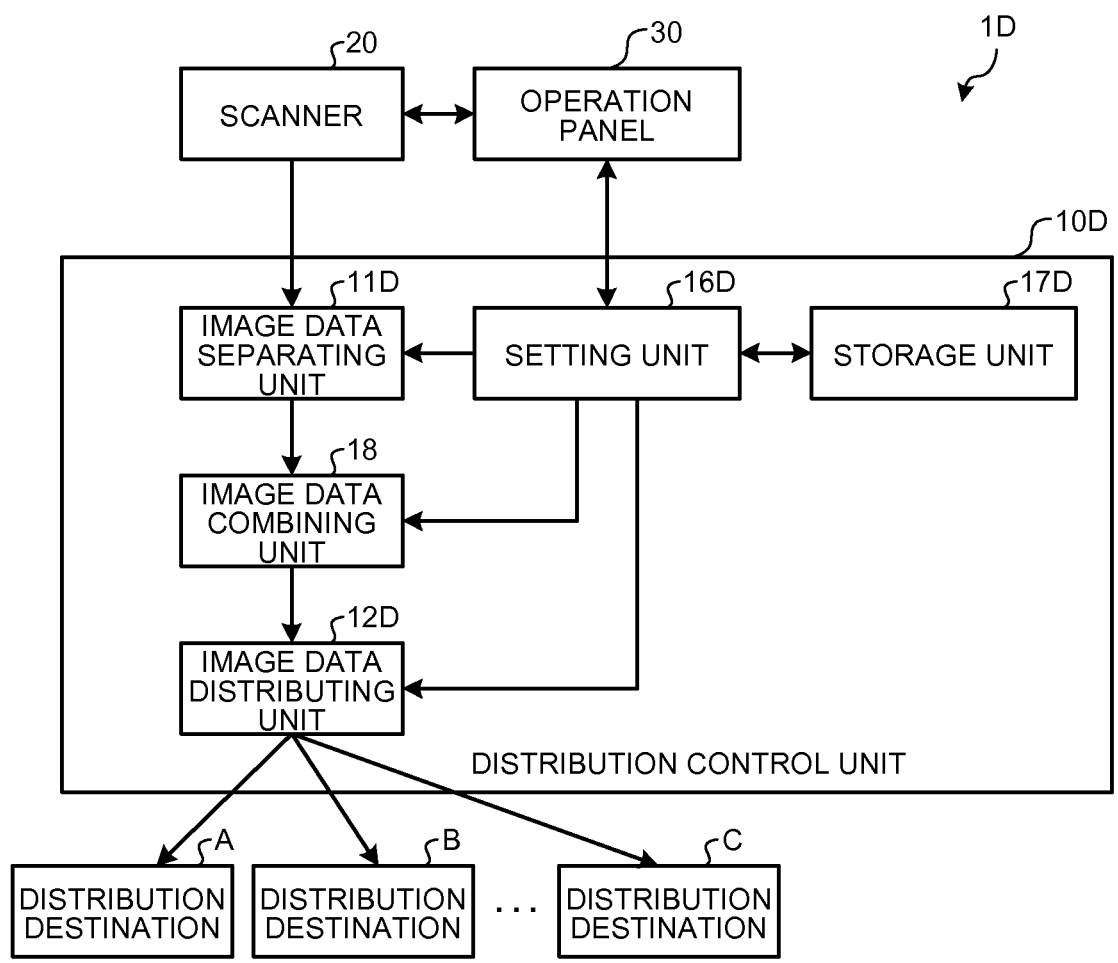
FIG. 15 is a block diagram of a configuration of a MFP in relation to distribution of image data according to a fourth modification.

FIG. 15 is a block diagram of a configuration of an MFP 1D in relation to distribution of image data according to the fourth modification. As illustrated in FIG. 15, the MFP 1D according to the fourth modification includes a distribution control unit 10D instead of the distribution control unit 10 of the MFP 1 described above. The distribution control unit 10D includes an image data separating unit 11D, an image data combining unit 18, an image data distributing unit 12D, a setting unit 16D, and a storage unit 17D.

The image data separating unit 11D separates the image data obtained through the series of document read operations performed by the scanner 20 into pieces of image data according to a predetermined condition. The condition used by the image data separating unit 11D for separating the image data may be the condition used by the MFP 1 described above for separating the image data according to the read sources of the document(s), may be the condition used by the MFP 1A according to the first modification for separating the image data for every predetermined number of pages, may be the condition used by the MFP 1B according to the second modification for separating the image data based on the position of the keyword, or may be the condition used by the MFP 1C according to the third modification for separating the image data for each of the document sets. Alternatively, the above conditions may be combined. In the following explanation, for example, it is assumed that the condition for separating image data according to the read sources of documents and the condition for separating image data for every predetermined number of pages are combined, and the image data separating unit 11D separates image data of a document read by the platen reading unit of the scanner 20 (hereinafter, this image data is described as "platen data") and image data of a document read by the ADF reading unit of the scanner 20 (hereinafter, this image data is described as "ADF data"), and further separates the ADF data for every predetermined number of pages.

The image data combining unit 18 combines the image data separated by the image data separating unit 11D based on a combination rule set by the setting unit 16D. The combination rule includes a rule for specifying a piece of image data to be combined from among the separated pieces of image data, that is, a rule for combining what pieces of image data are to be combined, and includes a rule for specifying an order of combination, that is, whether to combine one piece of image data at the head of or at the end of the other piece of image data. It is possible to set a rule for combining pieces of image data containing the same keyword, as the combination rule. In this case, if, for example, the name of an individual person is registered as a keyword, it is possible to combine pieces of image data containing the same name of the individual person and handle the combined pieces of the image data as a single piece of image data.

Figure 16:
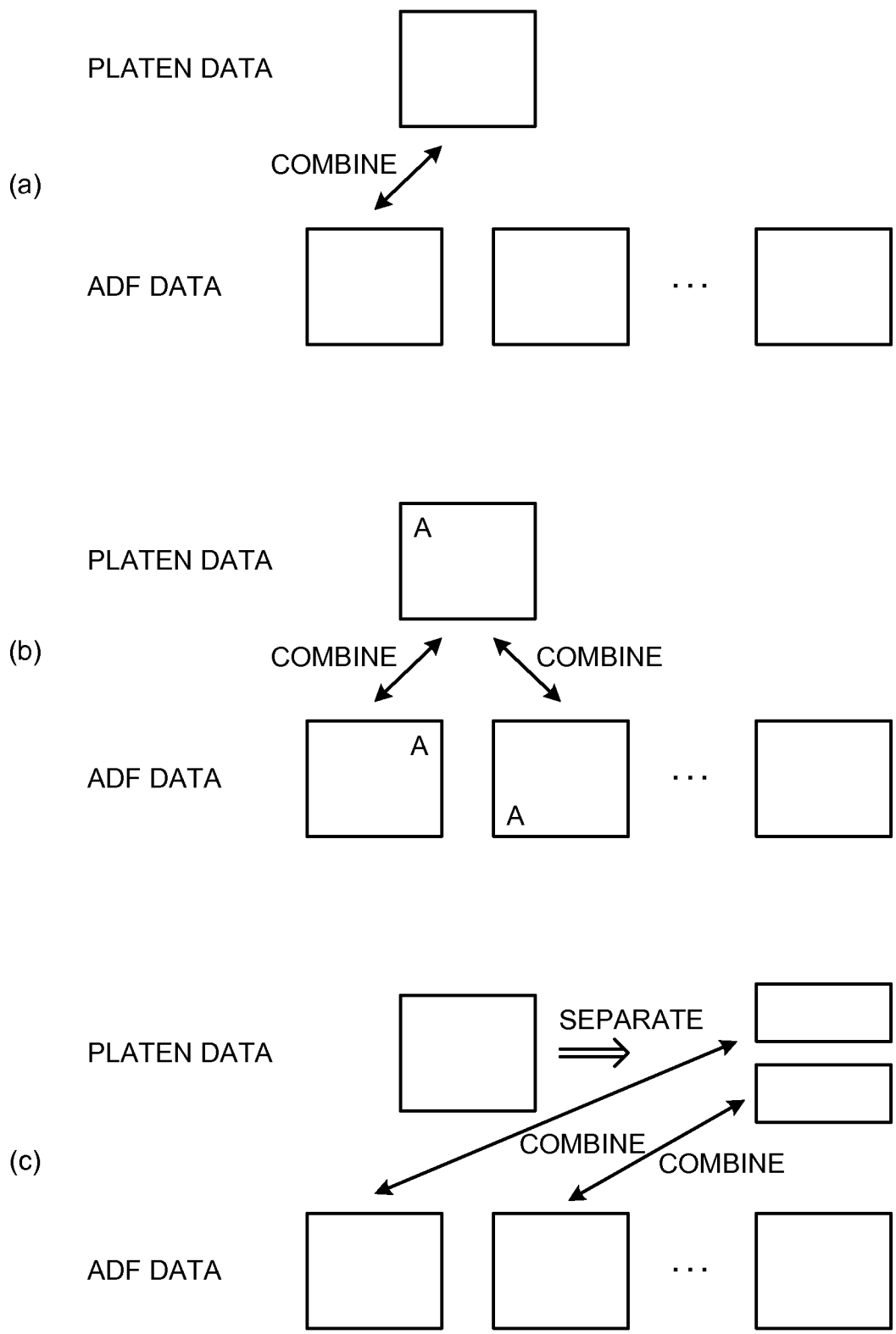
FIG. 16 illustrates how an image data combining unit combines pieces of image data.

FIG. 16 illustrates how the image data combining unit 18 combines pieces of image data. As illustrated in (a) of FIG. 16, for example, the image data combining unit 18 combines one piece of ADF data among a plurality of pieces of ADF data separated for every predetermined number of pages with the platen data in accordance with the combination rule set by the setting unit 16D, thereby obtaining a single piece of image data. Furthermore, the image data combining unit 18 may combine two pieces of ADF data from among the pieces of ADF data separated for every predetermined number of pages in accordance with the combination rule set by the setting unit 16D, thereby obtaining a single piece of image data. Moreover, when the setting unit 16D has set the combination rule for combining pieces of image data containing the same keyword, the image data combining unit 18 combines pieces of image data containing a keyword A as illustrated in (b) of FIG. 16, thereby obtaining a single piece of image data.

In the example explained above, the pieces of image data separate by the image data separating unit 11D are combined. However, it is possible to combine a part of the pieces of image data separated by the image data separating unit 11D with other piece of image data to obtain a single piece of image data. For example, it is possible to combine an M page of N-th ADF data with N+1-th ADF data and combine an M+1 page of the N-th ADF data with N+2-th ADF data, from among the pieces of ADF data separated for every predetermined number of pages. Furthermore, as illustrated in (c) of FIG. 16 for example, it is possible to separate the platen data according to a predetermined region size, and combine each of the separated pieces of platen data with the ADF data.

The setting unit 16D sets the combination rule for combining pieces of image data based on an input from a user through the operation panel 30 or information stored in the storage unit 17D. When the setting unit 16D sets the combination rule based on the information stored in the storage unit 17D, designation of image data to be combined, designation of the order of combination, or a keyword used for a combination is stored in advance in the storage unit 17D.

Figure 17:
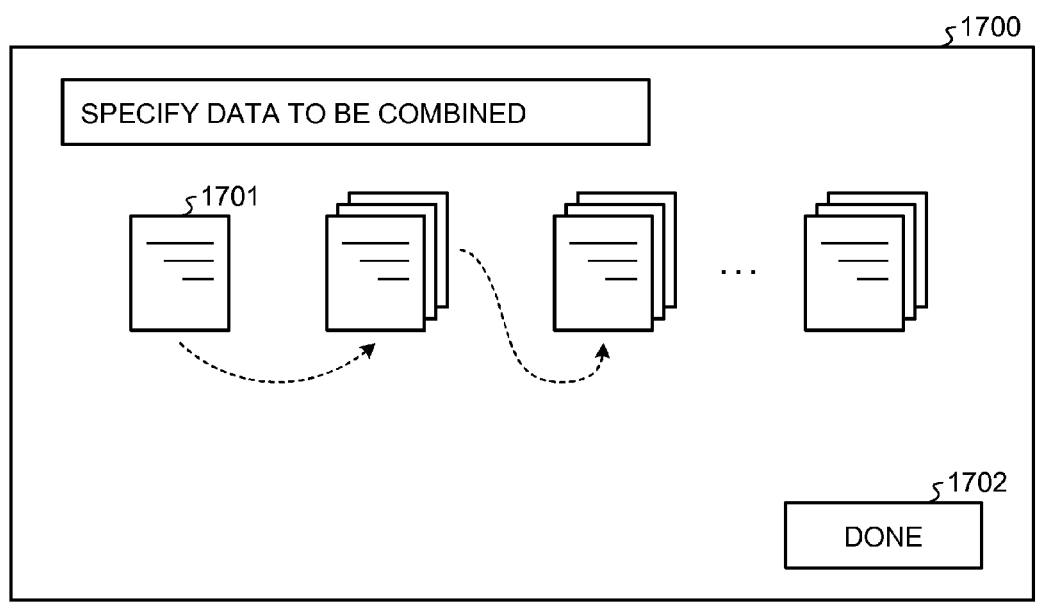
FIG. 17 is a diagram illustrating an example of a combination designation screen displayed on the operation panel.

When the combination rule is set based on the input from the user through the operation panel 30, after the scanner 20 completes the series of document read operations and the image data separating unit 11D separates the image data, the setting unit 16D displays a combination designation screen 1700 as illustrated in FIG. 17 for example on the touch panel display of the operation panel 30. The combination designation screen 1700 displays a thumbnail 1701 of each of the separated pieces of image data. When the user performs a predetermined operation for combining pieces of image data, such as a drag-and-drop operation for dragging and dropping one of the thumbnails 1701 of the pieces of image data onto other thumbnail, performs a predetermined operation for specifying the order of combination, and pressing a determination button 1702, the setting unit 16D sets the combination rule according to the operations performed by the user. When pieces of image data are to be combined based on a keyword, the setting unit 16D displays a combination designation screen containing a keyword input field on the touch panel display of the operation panel 30 and sets a keyword input by the user through the keyword input field as the combination rule.

The image data distributing unit 12D distributes the pieces of image data separated by the image data separating unit 11D to distribution destinations set by the setting unit 16D. In this case, the image data distributing unit 12D handles the pieces of image data combined by the image data combining unit 18 as a single piece of image data, and distributes the image data combined by the image data combining unit 18 to one distribution destination. The setting unit 16D sets a distribution destination for each of the pieces of image data based on an input from the user through the operation panel 30 or information stored in the storage unit 17D. When the setting unit 16D sets the distribution destination for each of the pieces of image date based on the information stored in the storage unit 17D, a default distribution destination of each of the pieces of image data is stored in advance in the storage unit 17D. When the setting unit 16D sets the distribution destination for each of the pieces of image data based on the input from the user through the operation panel 30, the setting unit 16D sets the distribution destination by using the same method as, for example, the method used by the setting unit 16A of the first modification.

The overview of an image data distribution process performed by the MFP 1D according to the fourth modification will be explained below with reference to FIG. 18. FIG. 18 is a flowchart of a flow of the image data distribution process performed by the distribution control unit 10D of the MFP 1D according to the fourth modification.

At Step S201, the image data separating unit 11D determines whether the setting unit 16D has set a condition for separating the image data. When the condition for separating the image data has been set (YES at Step S201), the process proceeds to Step S202. When the condition for separating the image data has not been set (NO at Step S201), the process proceeds to Step S205.

At Step S202, the image data separating unit 11D separates the image data obtained through the series of document read operations performed by the scanner 20 according to the condition set by the setting unit 16D, and the process proceeds to Step S203.

At Step S203, the image data combining unit 18 determines whether the setting unit 16D has set the combination rule for combining pieces of image data. When the combination rule for combining pieces of image data has been set (YES at Step S203), the process proceeds to Step S204. When the combination rule for combining pieces of image data has not been set (NO at Step S203), the process proceeds to Step S205.

At Step S204, the image data combining unit 18 combines the pieces of image data separated by the image data separating unit 11D according to the combination rule set by the setting unit 16D, and the process proceeds to Step S205.

At Step S205, the image data distributing unit 12D distributes the pieces of image data to distribution destinations set by the setting unit 16D. Then, the series of image data distribution process in the flowchart in FIG. 18 is terminated.

As described above, the MFP 1D according to the fourth modification separates the image data obtained through the series of document read operations by the scanner 20 into a plurality of pieces of image data. Thereafter, the MFP 1D combines at least a part of the separated pieces of image data with other piece of image data according to need, determines a distribution destination for each of the pieces of image data, and distributes each of the pieces of image data to the determined distribution destination. Therefore, it is possible to efficiently and flexibly distribute the image data according to user's need.

According to the embodiments of the present invention, image data obtained through a series of document read operations is separated into a plurality of pieces of image data, a distribution destination is determined for each of the pieces of image data, and each of the pieces of image data is distributed to the determined distribution destination. Therefore, it is possible to efficiently distribute the image data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image data distribution apparatus comprising:
an image data separating unit configured to separate image data obtained through a series of document read operations into a plurality of pieces of the image data according to at least one condition;
an associating unit configured to associate the separated pieces of the image data with pieces of read-source identification information for identifying a corresponding one of a plurality of read-sources; and
an image data distributing unit configured to,
determine a distribution destination, from a plurality of distribution destinations, for each of the separated pieces of the image data, and
distribute each of the separated pieces of the image data to a corresponding determined distribution destination based on one of the pieces of the read-source identification information associated with each of the separated pieces of the image data, wherein
the at least one condition includes each of a plurality of read-sources that read documents by scanning.

2. The image data distribution apparatus according to claim 1, further comprising:
a storage unit configured to store therein a correspondence relation between each of the pieces of read-source identification information and a corresponding one of the pieces of the image data, wherein
the image data distributing unit is configured to distribute each of the separated pieces of the image data to the corresponding determined distribution destination by referring to the correspondence relation stored in the storage unit.

3. The image data distribution apparatus according to claim 2, wherein when the plurality of pieces of the image data read by different read-sources are read as one job, the image data distributing unit is configured to distribute each of the plurality of pieces of the image data to the corresponding determined distribution destination.

4. The image data distribution apparatus according to claim 2, further comprising:
a receiving unit configured to receive an input for the correspondence relation specified by a user; and
a changing unit configured to change the correspondence relation stored in the storage unit to the input for the correspondence relation specified by the user.

5. The image data distribution apparatus according to claim 1, further comprising the read-sources, wherein after one of the read-sources reads a piece of the plurality of pieces of the image data, the associating unit is configured to add the piece of read-source identification information for identifying the one of the read sources to the piece of the plurality of pieces of the image data read by the one of the read sources, to associate the piece of the plurality of pieces of the image data with the piece of read-source identification information.

6. The image data distribution apparatus according to claim 1, wherein the at least one condition further includes a given number of pages.

7. The image data distribution apparatus according to claim 1, wherein the at least one condition further includes a position of a keyword contained in the image data.

8. The image data distribution apparatus according to claim 1, wherein when the series of document read operations includes operations of sequentially setting and reading a plurality of document sets, the at least one condition further includes the document sets.

9. The image data distribution apparatus according to claim 1, further comprising:
an image data combining unit configured to combine at least one of the separated pieces of the image data with another one of the separated pieces of the image data to obtain a piece of a combined image data, wherein
the image data distributing unit is configured to automatically determine one of the plurality of distribution destinations for the piece of the combined image data.

10. The image data distribution apparatus according to claim 9, wherein the image data combining unit is configured to combine the one of the separated pieces and the other one of the separated pieces of the image data as specified by a user operation.

11. The image data distribution apparatus according to claim 9, wherein the image data combining unit is configured to combine pieces of the image data based on a combination rule.

12. An image data distribution system comprising:
a reading device configured to read documents; and
an image data distribution apparatus configured to receive image data obtained through a series of document read operations by the reading device,
the image data distribution apparatus including,
an image data separating unit configured to separate the image data obtained through the series of document read operations into a plurality of pieces of the image data according to at least one condition,
an associating unit configured to associate the separated pieces of the image data with pieces of read-source identification information for identifying a corresponding one of a plurality of read-sources, and
an image data distributing unit configured to,
determine a distribution destination, from a plurality of distribution destinations, for each of the separated pieces of the image data, and
distribute each of the separated pieces of the image data to a corresponding determined distribution destination based on one of the pieces of the read-source identification information associated with each of the separated pieces of the image data wherein the at least one condition includes each of a plurality of read-sources that read documents by scanning.

13. A non-transitory computer-readable storage medium with an executable program stored thereon, wherein the program instructs a computer to perform:
separating image data obtained through a series of document read operations into a plurality of pieces of the image data according to a condition;
associating the separated pieces of the image data with pieces of read-source identification information for identifying a corresponding one of a plurality of read-sources:
determining a distribution destination, from a plurality of distribution destinations, for each of the separated pieces of the image data; and
distributing each of the separated pieces of the image data to a corresponding determined distribution destination based on one of the pieces of the read-source identification information associated with each of the separated pieces of the image data, wherein
the at least one condition includes each of a plurality of read-sources that read documents by scanning.

14. The image data distribution apparatus according to claim 1, wherein the plurality of read-sources include at least an Automatic Document Feeder (ADF) reading unit and a platen reading unit.

* * * * *